Oct. 12, 1971 R. M. CHAPPEL 3,611,547
METHOD AND DEVICE FOR REMOVING MEMBRANES FROM TUBULAR SUPPORTS
Filed Nov. 20, 1968
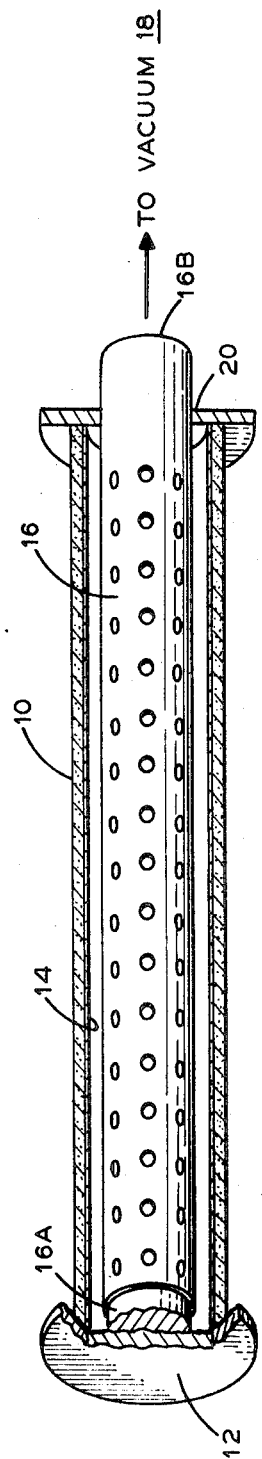
INVENTOR.
Raymond M. Chappel
BY Sheldon H Parker
ATTORNEY

3,611,547
METHOD AND DEVICE FOR REMOVING MEMBRANES FROM TUBULAR SUPPORTS
Raymond M. Chappel, Whippany, N.J., assignor to Abcor Water Management Company, Inc., Cambridge, Mass.
Filed Nov. 20, 1968, Ser. No. 777,307
Int. Cl. B23p 19/02
U.S. Cl. 29—427                                    11 Claims

ABSTRACT OF THE DISCLOSURE

A device for removing a membrane from a tubular support therefor which comprises a porous tube having one end sealed and the opposite end in communication with a vacuum source, the porous tube being adapted for insertion within the tubular support such that the membrane circumscribes the porous tube. Associated with the device is a method for removing the membrane liners from the tubular support which involves inserting a porous tubular member within the membrane liner housed in the tubular support, pulling a vacuum on the porous tubular member thereby causing collapse of the membrane against the porous tube tubular member, and removing the porous tubular member and the membrane from the tubular support.

BACKGROUND OF THE INVENTION

Field of the invention

This invention relates to a method and device for removing membranes from tubular supports. More particularly, this invention relates to the removal of reverse osmosis membranes supported on the internal walls of a porous or otherwise support tube.

Description of the prior art

Tubular osmotic membranes useful in reverse-osmosis separation processes are described and claimed in copending application Ser. No. 508,052, filed Nov. 16, 1965, now abandoned, assigned to the assignee hereof. These membranes are ordinarily thin films having a thickness of only a few thousandths of an inch. Thus in order to withstand the high working pressures employed in desalination and similar reverse osmosis processes, these tubular membranes must be supported either from within by a porous cylindrical body about which the membrane may be wrapped as a sleeve, or from without by a porous cylindrical tube, into which the membrane may be inserted as a lining. Various materials such as ceramics, sintered powdered metals and the like are available for the construction of support members.

From time to time, these membranes have to be replaced after repeated use due to wear and the like. In the past, these membranes have been replaced by removing the worn membrane manually and inserting a new one in its place. However, such removal is time consuming and does not perform the task adequately. Due to the thinness of the membranes they have a tendency to tear upon removal whereby portions thereof remain lodged inside the tube. Hence, often the entire tubular assembly must be discarded which is obviously costly.

SUMMARY OF THE INVENTION

There has now been found in accordance with the present invention a method and device for removing such membranes which method avoids the foregoing drawbacks.

An object of this invention, therefore, is to provide a method and a device associated therewith whereby such membrane removal is easily and positively accomplished.

Broadly, the device of the invention for removing membranes from tubular supports comprises a membrane removal tube which is perforated or made of a porous material, one end of which is closed. The diameter of the tube is slightly smaller than the internal diameter of the membrane. The perforated section of the tube is at least as long as the membrane.

In the method of the present invention, one end of the membrane tubular support is closed, and the membrane removal tube is inserted from the open end of the tubular support closed end first with a small length remaining extended beyond the tubular support to provide an attachment to a vacuum system. The annular gap created between the other end of the membrane support tube and the membrane removal tube is then sealed, and a vacuum is pulled on the porous (or perforated) membrane removal tube. This vacuum causes collapse of the membrane upon the membrane removal tube which is then removed from the support tube along with the membrane. Thereupon, the vacuum is removed and the membrane pulled off the tube.

BRIEF DESCRIPTION OF THE DRAWINGS

Further details of the present invention may best be understood by description given in connection with the drawing which illustrates certain preferred embodiments of the invention and in which:

FIG. 1 is a perspective view of a preferred embodiment of a device suitable for removing membranes from tubular supports.

DESCRIPTION OF THE PREFERRED EMBODIMENTS

Referring now to the drawing there is shown a tubular member 10 having a membrane 14 housed therein as a liner. The tubular member 10 is sealed at one end by means of a suitable plug 12.

In the practice of the method of this invention, a porous tube 16 having a closed end 16a and an open end 16b and a diameter smaller than the inside diameter of the membrane 14 is inserted through the open end of the tubular member 10 as shown. The porous tube 16 has a length somewhat longer than that of the tubular member 10 so that the end 16b of the tube 16 extends outside of the tubular member 10. This end 16b of the tube is connected to a vacuum source 18. The annular gap between the tubular member 10 and the porous tube 16 is sealed by a suitable plug 20.

The above device readily lends itself to ganging to permit removal of the membranes from modules containing a multiplicity of tubular membrane supports by using a ganged series of porous removal tubes 16, one for each membrane to be removed.

In the drawing, it should be understood that the thickness of the membrane is greatly exaggerated relative to the other elements shown, and that the actual membranes are only a few thousandths of an inch in thickness. Moreover, many details such as sealing rings, threaded connections and the like have been omitted in the interest of emphasizing the essential features of the invention.

Although the invention has been described in its preferred forms with a certain degree of particularity, it is understood that the present disclosure of the preferred forms has been made only by way of example, and that numerous changes in the details of construction and the combination and arrangement of parts may be resorted to without departing from the spirit and the scope of the invention.

What is claimed is:
1. A device for removing a membrane liner from a tubular support, which device comprises in combination:
   (a) a tubular support containing a membrane liner, the membrane liner housed within the interior walls of the tubular support, one end of said tubular support being sealed;

(b) a porous tube having one end sealed, the diameter of said porous tube being less than the inside diameter of said membrane liner in said tubular support, the porous tube being adapted for insertion within the tubular support such that the membrane circumscribes said porous tube;

(c) means to insert said porous tube within the tubular support;

(d) means to provide a vacuum-tight seal of the inserted porous tube within the tubular support;

(e) means to create a vacuum within the said porous tube so as to cause a collapse of the membrane liner against the exterior of said porous tube, said means being in communication with the opposite end of said porous tube; and (f) means to remove the porous tube containing the collapsed membrane from the interior of the tubular support.

2. The device of claim 1 wherein a porous section of the porous tube extends at least as long as the membrane liner.

3. The device of claim 1 wherein the membrane device comprises a plurality of tubular supports and wherein the porous tubes are in a ganged series, one tube for each support tube so as to permit removal of the membrane liners from each of the plurality of tubular supports at one time.

4. The device of claim 6 wherein the porous tube is characterized by a plurality of perforated holes positioned substantially uniformly about the periphery of the tube.

5. The device of claim 1 wherein one end of the tubular support is sealed in a vacuum-tight manner with a plug, the porous tube extends outwardly from the other end of the tubular support, and the gap between the exterior wall of the porous tube and the interior wall of the tubular support is sealed in a vacuum-tight manner with an annular plug.

6. The device of claim 1 wherein the porous tube is spaced slightly less than and substantially uniformly apart from the interior wall of the tubular support throughout the length of the tubular support.

7. A method of removing a membrane liner from the interior of a tubular support in a membrane device, which method comprises:

(a) inserting a porous tube within a tubular support containing a thin membrane liner housed within the tubular support, which membrane liner is desired to be removed, the diameter of said porous tube being less than the inside diameter of said membrane;

(b) sealing the inserted porous tube to provide a substantially vacuum-tight chamber within the tubular support;

(c) creating a vacuum within said porous tubular member, while so inserted to effect a collapse of the membrane liner against said porous tubular member and away from the interior wall of the tubular support; and (d) removing said porous tube and said collapsed membrane from said tubular support.

8. The method of claim 7 which includes providing a porous section of the porous tube at least as long as the membrane liner to be removed from the tubular support of the membrane device.

9. The method of claim 7 which includes sealing the porous tube in the tubular support by inserting a plug in the opposite end of the tubular support from the end in which porous tube is inserted; and inserting an annular plug to fill the annular gap between the porous tubular membrane and the support tube at the opposite end to provide substantially vacuum-tight chambers in the interior of the tubular support.

10. The method of claim 7 which includes providing a gang of porous tubes and inserting the gang tubes within a plurality of tubular supports to provide for the removal of the membrane liners in each of the tubular supports at the same time, one membrane being removed for each porous tube in the gang employed.

11. The method of claim 7 which includes inserting a porous tube, and spacing the exterior wall of the tube substantially uniformly apart from the interior wall of the tubular support, the diameter of the porous tube being slightly less than the diameter of the tubular support.

References Cited

UNITED STATES PATENTS

| 1,619,362 | 3/1927 | Murray | 29—427 UX |
| 2,366,935 | 1/1945 | Schmid | 29—DIG 44 UX |
| 2,575,631 | 11/1951 | Link | 269—21 UX |
| 2,753,181 | 7/1956 | Anander | 269—21 X |
| 2,777,602 | 1/1957 | Genich | 294—64 X |
| 3,015,599 | 1/1962 | Roberts et al. | 29—235 X |

CHARLIE T. MOON, Primary Examiner

U.S. Cl. X.R.

29—234, 235, 451

UNITED STATES PATENT OFFICE
CERTIFICATE OF CORRECTION

Patent No. 3,611,547                    Dated October 12, 1971

Inventor(s)    Raymond M. Chappel

It is certified that error appears in the above-identified patent and that said Letters Patent are hereby corrected as shown below:

In column 3, claim 4, line 29, "6" should read --1--.

Signed and sealed this 25th day of April 1972.

(SEAL)
Attest:

EDWARD M. FLETCHER, JR.                ROBERT GOTTSCHALK
Attesting Officer                       Commissioner of Patents